(12) United States Patent
Neeley (10) Patent No.: US 8,998,231 B2
(45) Date of Patent: Apr. 7, 2015

(54) BICYCLE SUSPENSION SYSTEM

(71) Applicant: Eric Neeley, Colorado Springs, CO (US)

(72) Inventor: Eric Neeley, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 13/856,886

(22) Filed: Apr. 4, 2013

(65) Prior Publication Data

US 2014/0300073 A1 Oct. 9, 2014

(51) Int. Cl.
*B60G 17/04* (2006.01)
*B62K 25/04* (2006.01)
*B62K 23/00* (2006.01)

(52) U.S. Cl.
CPC ............... *B60G 17/04* (2013.01); *B62K 23/00* (2013.01); *B62K 2025/048* (2013.01); *B62K 2025/047* (2013.01)

(58) Field of Classification Search
CPC ...... B60G 17/005; B60G 17/04; B60G 17/08; B60G 17/033; B60G 2202/15; B60G 2202/24; B62K 25/04; B62K 2025/04; B62K 2025/047; B62K 2025/048; B62K 2201/08
USPC .......... 188/284, 299.1, 300, 322.22; 267/64.11, 64.12, 64.13, 64.28, 124; 280/275, 276, 283, 284, 124.16, 280/124.161, 124.162
See application file for complete search history.

(56) References Cited

U.S. PATENT DOCUMENTS

| | | | |
|---|---|---|---|
| 4,159,105 A * | 6/1979 | Vander Laan et al. ........ | 267/218 |
| 4,179,135 A * | 12/1979 | Slater ........................... | 280/276 |
| 4,524,844 A * | 6/1985 | Williams, Jr. .................. | 180/219 |
| 4,609,202 A * | 9/1986 | Miyakoshi et al. ........... | 280/276 |
| 4,765,432 A * | 8/1988 | Odom .......................... | 180/227 |
| 5,044,648 A * | 9/1991 | Knapp .......................... | 280/283 |
| 5,201,384 A * | 4/1993 | Kiyota et al. ................. | 180/219 |
| 5,275,264 A * | 1/1994 | Isella .......................... | 188/299.1 |
| 5,320,375 A * | 6/1994 | Reeves et al. ................. | 280/284 |
| 5,354,085 A * | 10/1994 | Gally ............................ | 280/285 |
| 5,553,880 A * | 9/1996 | McJunkin et al. ............ | 280/283 |
| 5,553,881 A * | 9/1996 | Klassen et al. ................ | 280/284 |
| 6,026,939 A * | 2/2000 | Girvin et al. ............... | 188/266.7 |
| 6,109,636 A * | 8/2000 | Klein et al. ................... | 280/284 |
| 6,120,049 A * | 9/2000 | Gonzalez et al. ............. | 280/276 |
| 6,145,862 A * | 11/2000 | D'Aluisio et al. ............ | 280/276 |
| 6,217,049 B1 * | 4/2001 | Becker ......................... | 280/276 |
| 6,254,067 B1 * | 7/2001 | Yih ............................. | 267/64.22 |
| 6,286,642 B1 * | 9/2001 | Yi .............................. | 188/319.2 |
| 6,328,292 B1 * | 12/2001 | Jarstad ....................... | 267/64.21 |
| 6,371,263 B1 * | 4/2002 | Hoose .......................... | 188/312 |
| 6,382,370 B1 * | 5/2002 | Girvin ....................... | 188/299.1 |
| 6,543,799 B2 * | 4/2003 | Miyoshi ....................... | 280/283 |
| 6,592,136 B2 * | 7/2003 | Becker et al. ................. | 280/276 |
| 6,688,626 B2 * | 2/2004 | Felsl et al. .................... | 280/275 |

(Continued)

*Primary Examiner* — Paul N Dickson
*Assistant Examiner* — Laura Freedman
(74) *Attorney, Agent, or Firm* — Milan Milosevic; Lisa Serdynski (57) ABSTRACT

A bicycle suspension system of the invention generally includes at least two bicycle suspensions and a hydraulic control assembly. The hydraulic control assembly includes a pair of fluid pumps, and a fluid responder and a fluid path for each of the bicycle suspensions. The fluid pumps are mountable to a bicycle handlebar and form part of the hydraulic control assembly. A fluid responder is mountable each of the bicycle suspensions. The fluid paths link the fluid pump to a respective fluid responder. Each fluid responder is operatively connected to one of the bicycle suspensions to operate the bicycle suspension system between first and second suspension settings in response to fluid displacement between each fluid pump and each of the fluid responders.

21 Claims, 11 Drawing Sheets

(56) References Cited

U.S. PATENT DOCUMENTS

| | | | |
|---|---|---|---|
| 6,767,024 B1* | 7/2004 | Kuo | 280/276 |
| 6,837,507 B1* | 1/2005 | McJunkin | 280/276 |
| 7,147,207 B2* | 12/2006 | Jordan et al. | 251/263 |
| 7,163,223 B2* | 1/2007 | Wesling et al. | 280/276 |
| 7,182,358 B2* | 2/2007 | Felsl et al. | 280/283 |
| 7,722,069 B2* | 5/2010 | Shirai | 280/276 |
| 7,806,022 B2* | 10/2010 | Hara | 74/502.2 |
| 7,870,936 B2* | 1/2011 | Shipman | 188/299.1 |
| 7,988,173 B2* | 8/2011 | Morris | 280/276 |
| 8,029,010 B2* | 10/2011 | Achenbach | 280/276 |
| 8,091,910 B2* | 1/2012 | Hara et al. | 280/283 |
| 8,121,757 B2* | 2/2012 | Song et al. | 701/37 |
| 8,286,982 B2* | 10/2012 | Plantet et al. | 280/277 |
| 8,464,844 B2* | 6/2013 | Jordan | 188/24.22 |
| 8,480,064 B2* | 7/2013 | Talavasek | 267/217 |
| 8,539,857 B2* | 9/2013 | Chen | 74/502.2 |
| 2002/0084619 A1* | 7/2002 | Odom | 280/276 |
| 2002/0117830 A1* | 8/2002 | Holt et al. | 280/283 |
| 2005/0103149 A1 | 5/2005 | Hunt | |
| 2005/0252330 A1* | 11/2005 | Denk | 74/502.2 |
| 2009/0096184 A1* | 4/2009 | Krudenscheidt | 280/201 |
| 2010/0059964 A1 | 3/2010 | Morris | |
| 2011/0247448 A1 | 10/2011 | Weiss et al. | |
| 2012/0221205 A1 | 8/2012 | Ichida et al. | |
| 2013/0174543 A1 | 7/2013 | Nago | |
| 2014/0013875 A1* | 1/2014 | Neeley | 74/89 |
| 2014/0088828 A1* | 3/2014 | Wesling et al. | 701/37 |

* cited by examiner

BICYCLE SUSPENSION SYSTEM

BACKGROUND OF THE INVENTION

The invention relates to bicycle suspension systems and more particularly to a hydraulic control assembly to operate first and second bicycle suspensions between first and second suspension settings.

BRIEF SUMMARY OF THE INVENTION

The invention provides a hydraulic control assembly for operating a bicycle suspension system including first and second bicycle suspensions. The hydraulic control assembly includes two separate fluid pumps, each of the two fluid pumps including a hydraulic cylinder and piston. Each of the bicycle suspensions includes a fluid responder. A separate fluid path communicates between each of the two hydraulic cylinders and the fluid responders.

The control assembly is mountable to a bicycle handlebar. The two fluid responders are mountable to the bicycle suspensions. Each of the fluid responders is operatively connected to one of the first and second bicycle suspensions to operate between the first and second suspension settings in response to fluid displacement between the fluid pumps and the fluid responders. An actuator is operatively connected to the first piston and is configured to displace both pistons. The control assembly includes a push-push toggle mechanism.

These and other features of the invention will be more fully understood from the following description of one or more embodiments of the invention, taken together with the accompanying drawings.

DETAILED DESCRIPTION OF THE INVENTION

Figure 1:
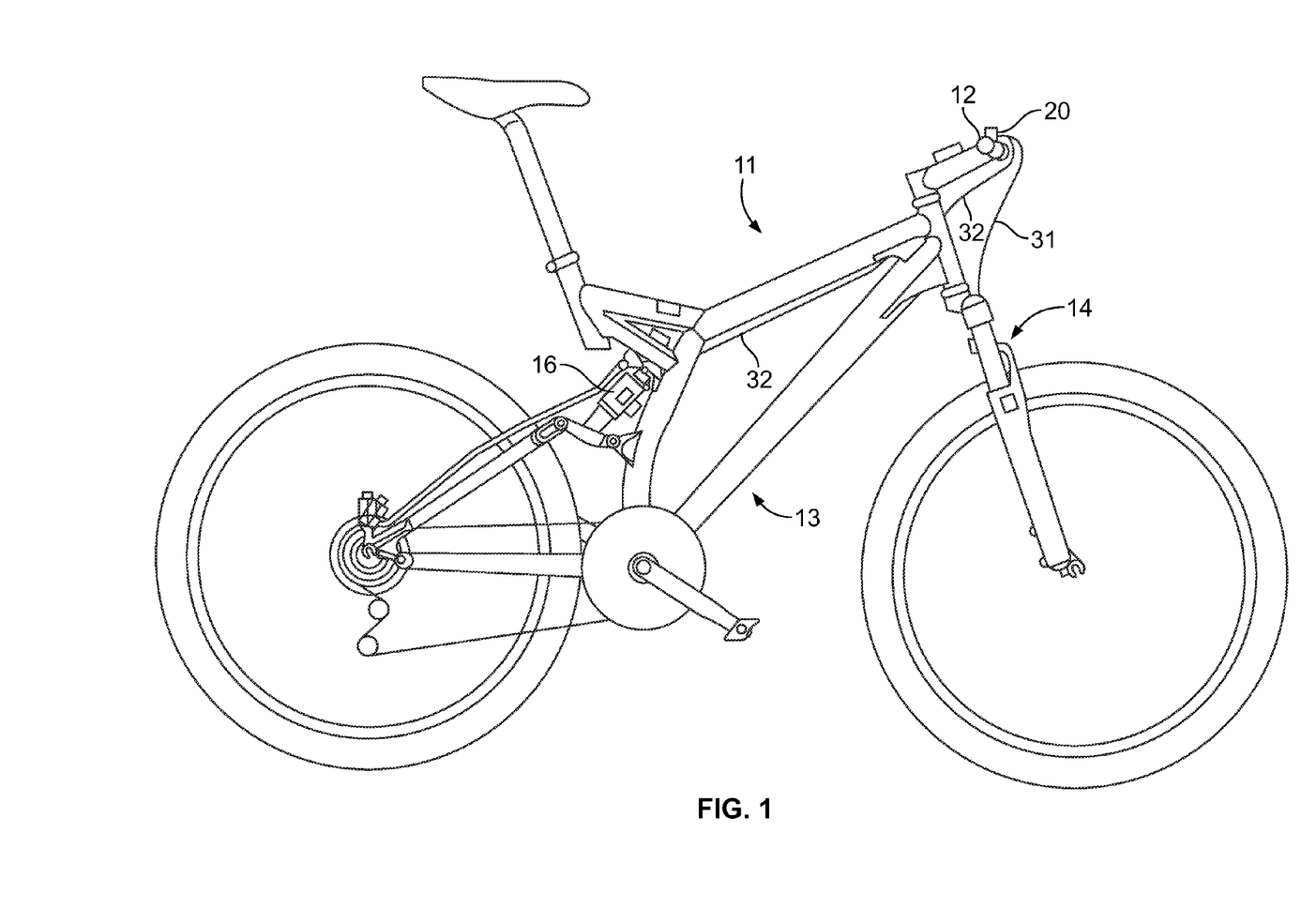
FIG. 1 is a bicycle with a bicycle suspension system, including front and rear suspensions, according to one embodiment of the invention.

Referring to FIG. 1, the present invention provides a bicycle 11 including a bicycle suspension system 13 generally including a front bicycle suspension 14 and a rear bicycle suspension 16. A hydraulic control assembly 20 is provided in communication with the front and rear bicycle suspensions 14, 16. The hydraulic control assembly 20 may be mounted to a bicycle handlebar 12 or another suitable location on the bicycle and in use causes the front suspension 14 and rear suspension 16 to change between first and second suspension settings. In one embodiment, the hydraulic control assembly 20 causes the front and rear suspensions 14, 16 to switch between "lock-out" and non-lock out settings. "Lock-out" refers to a condition where the suspension component is rendered relatively incompressible or substantially rigid to minimize peddling-induced bobbing of the bicycle.

Figure 2:
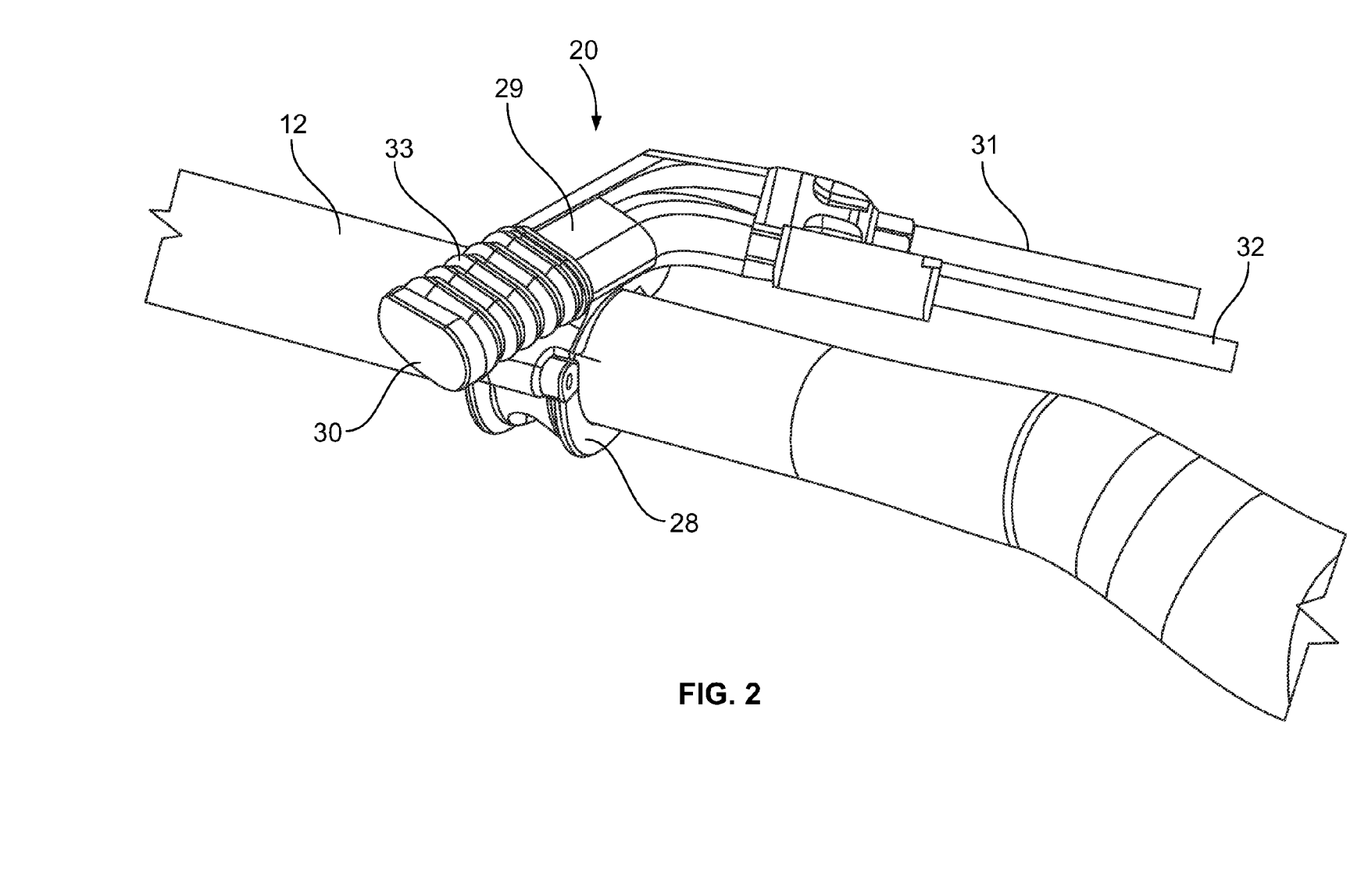
FIG. 2 is a top perspective view of a hydraulic control assembly for operating the bicycle suspension system.

Referring to FIG. 2, the hydraulic control assembly 20 may include a control housing 29, an actuator 30, a rubber boot 33, a first fluid path 31, and a second fluid path 32. The actuator 30 is the interface used by a rider to operate the control assembly 20 and therefore the bicycle suspension system 13. In one embodiment, the actuator 30 is a button or a similar manual control. The optional rubber boot 33 is a flexible, elastomeric sleeve that extends between the actuator 30 and the control housing 29 and may be in the form of an accordion so as to easily expand and contract to shield the interior of the assembly from dirt and contaminants. The fluid paths 31, 32 include hydraulic lines that are attached to the control housing 29 and conduct changes in fluid pressure therethrough. The hydraulic control assembly 20 may be attachable to the handlebar 12 via a standard clamp 28, preferably in a position convenient for rider access without releasing one's grip of the handlebar.

Figure 3:
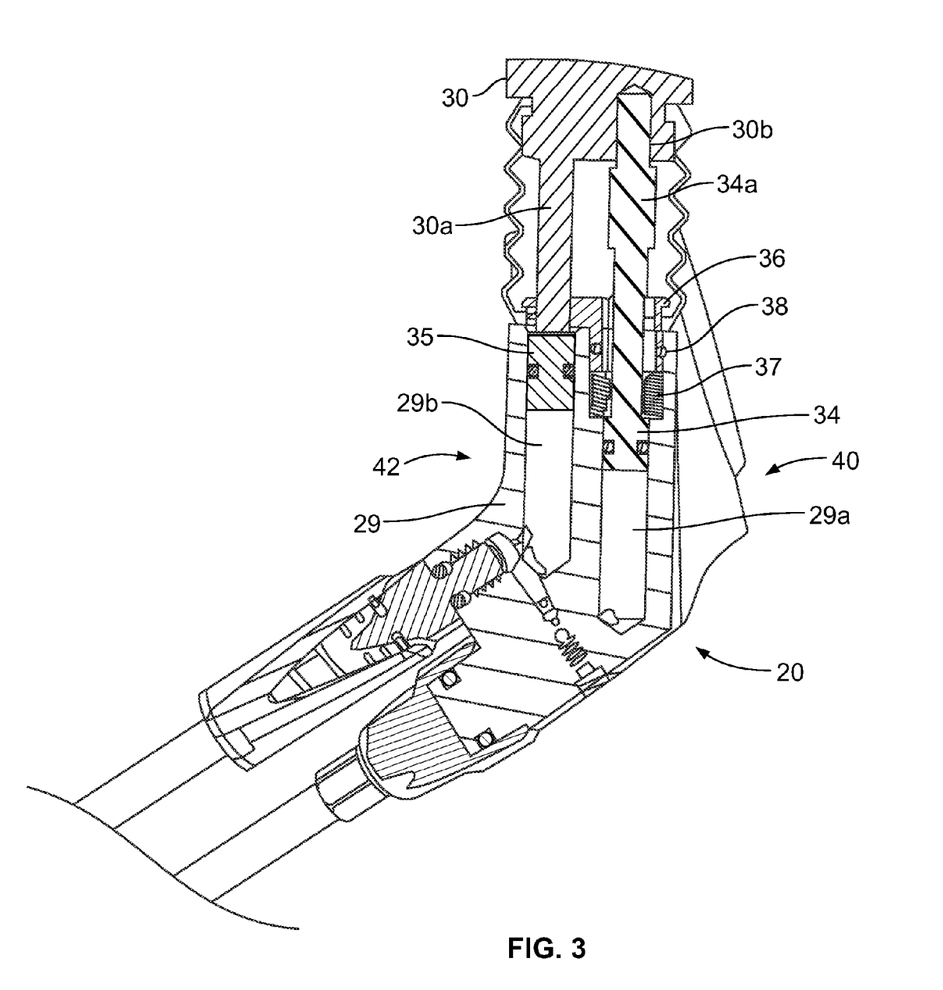
FIG. 3 is a top sectional view of the hydraulic control assembly.

Referring to FIG. 3, the hydraulic control assembly 20 includes a first fluid pump 40 including a first piston 34 slidably disposed within a first fluid cavity 29a, a chamber or bore, typically cylindrical, formed within the control housing 29. The hydraulic control assembly 20 includes a second fluid pump 42 including a second piston 35 slidably disposed within a second fluid cavity 29b, chamber or bore formed within the control housing 29. The first and second cavities 29a, 29b may be generally parallel, but are separate, i.e., not in communication with each other.

Figure 5:
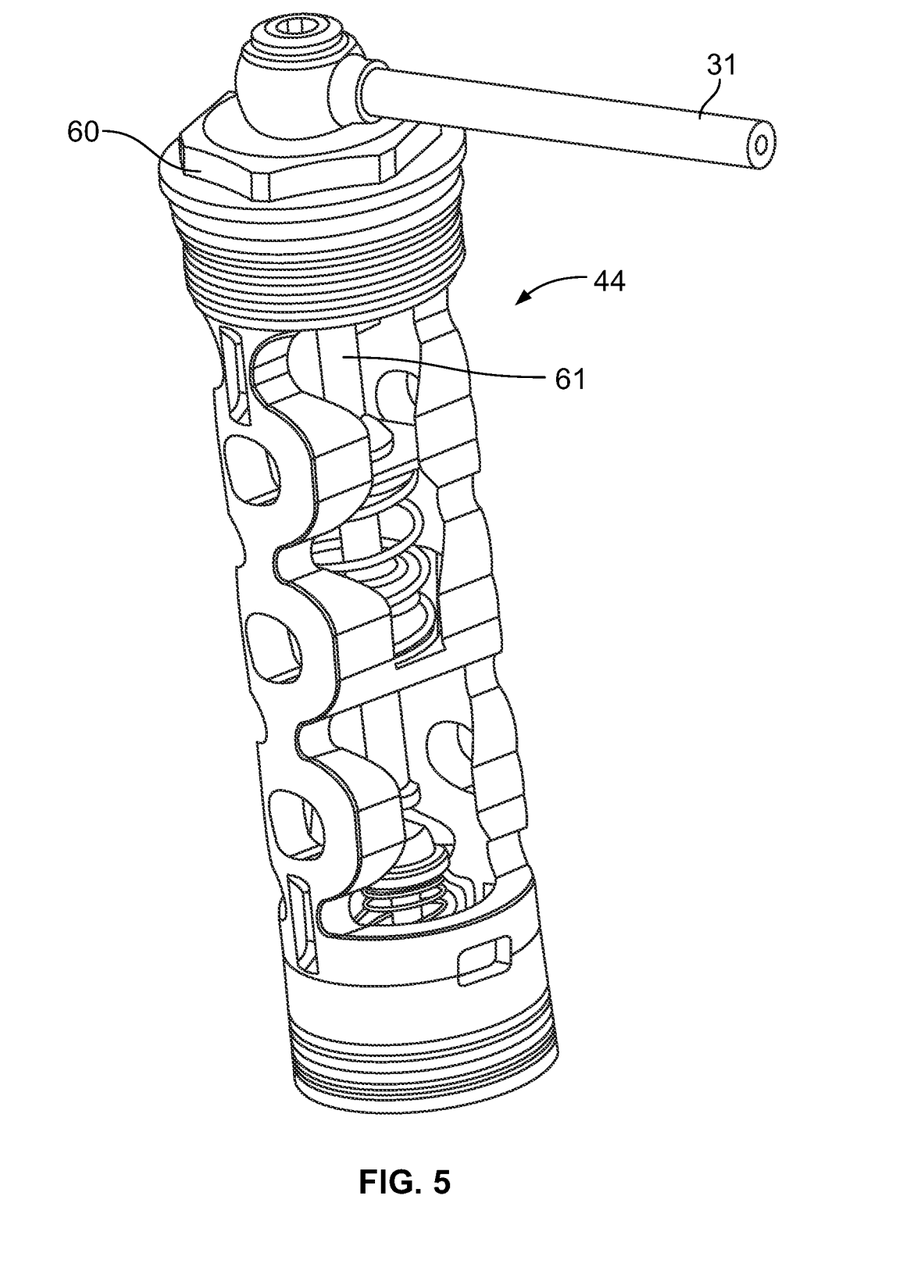
FIG. 5 is a perspective view of a first fluid responder of a front suspension mechanism of the bicycle suspension system.
Figure 6:
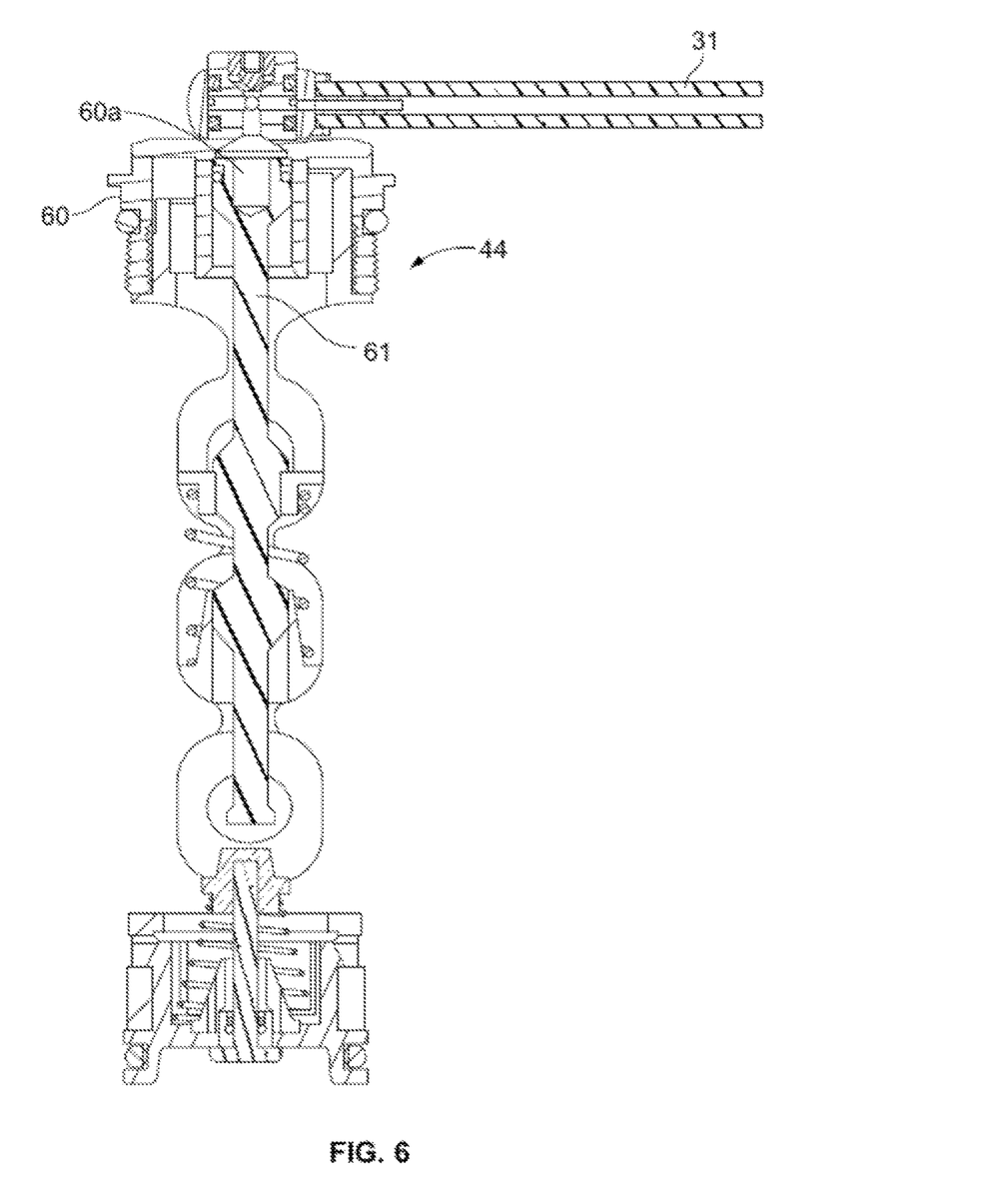
FIG. 6 is sectional view of the first fluid responder.

Referring to FIGS. 5 and 6, the first cavity 29a is in communication with a first fluid responder 44, which is mountable to and forms part of the front suspension 14. The first fluid responder 44 includes a first responder housing 60 and a third piston 61.

Referring to FIG. 6, the third piston 61 is slidably disposed within a third fluid cavity 60a formed within the first responder housing 60. The first fluid path 31, which may include a hydraulic hose or the like, connects the first fluid cavity 29a to the third fluid cavity 60a. The third piston 61 operates the front suspension 14 between the first and second suspension setting.

Figure 7:
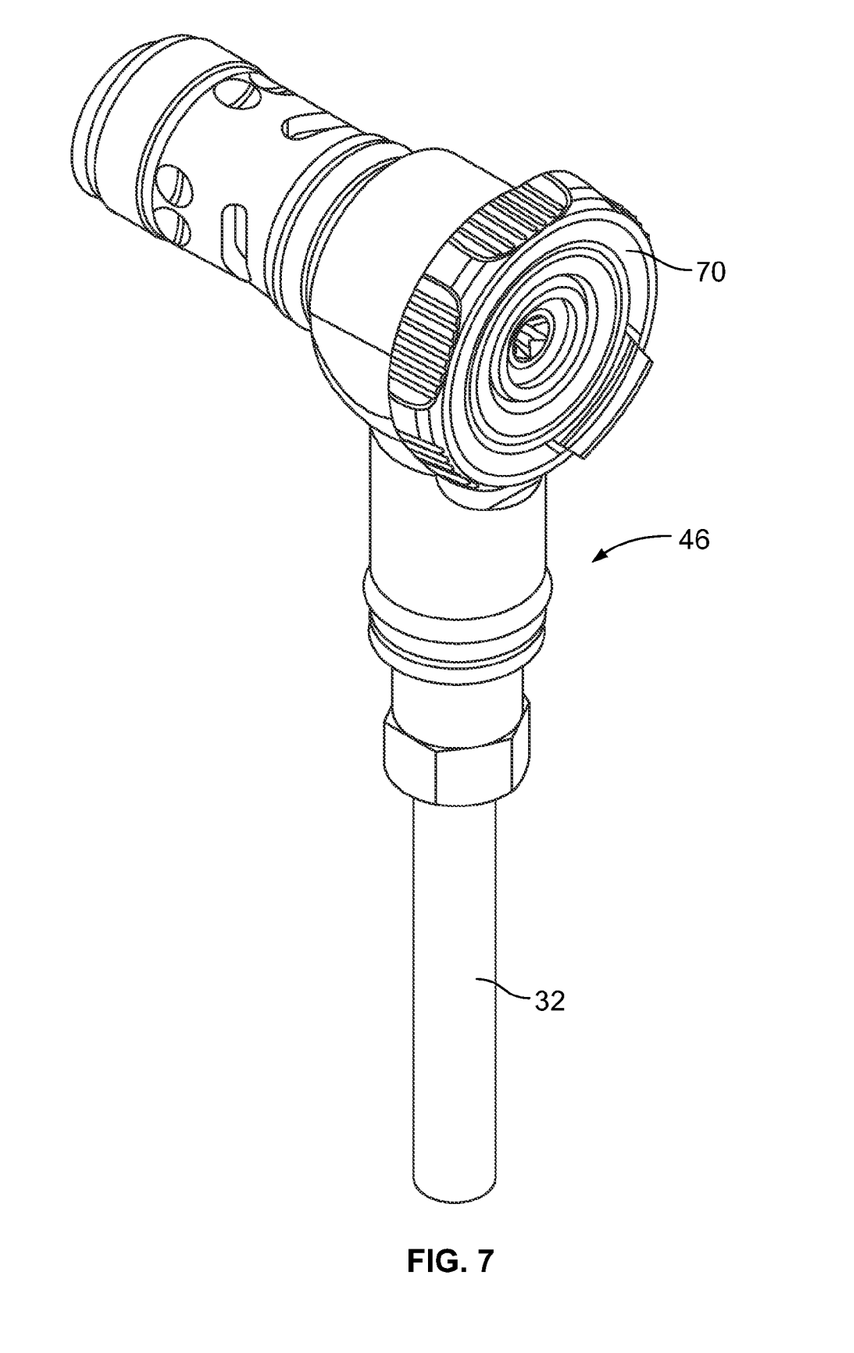
FIG. 7 is a perspective view of a second fluid responder of the bicycle suspension system.
Figure 8:
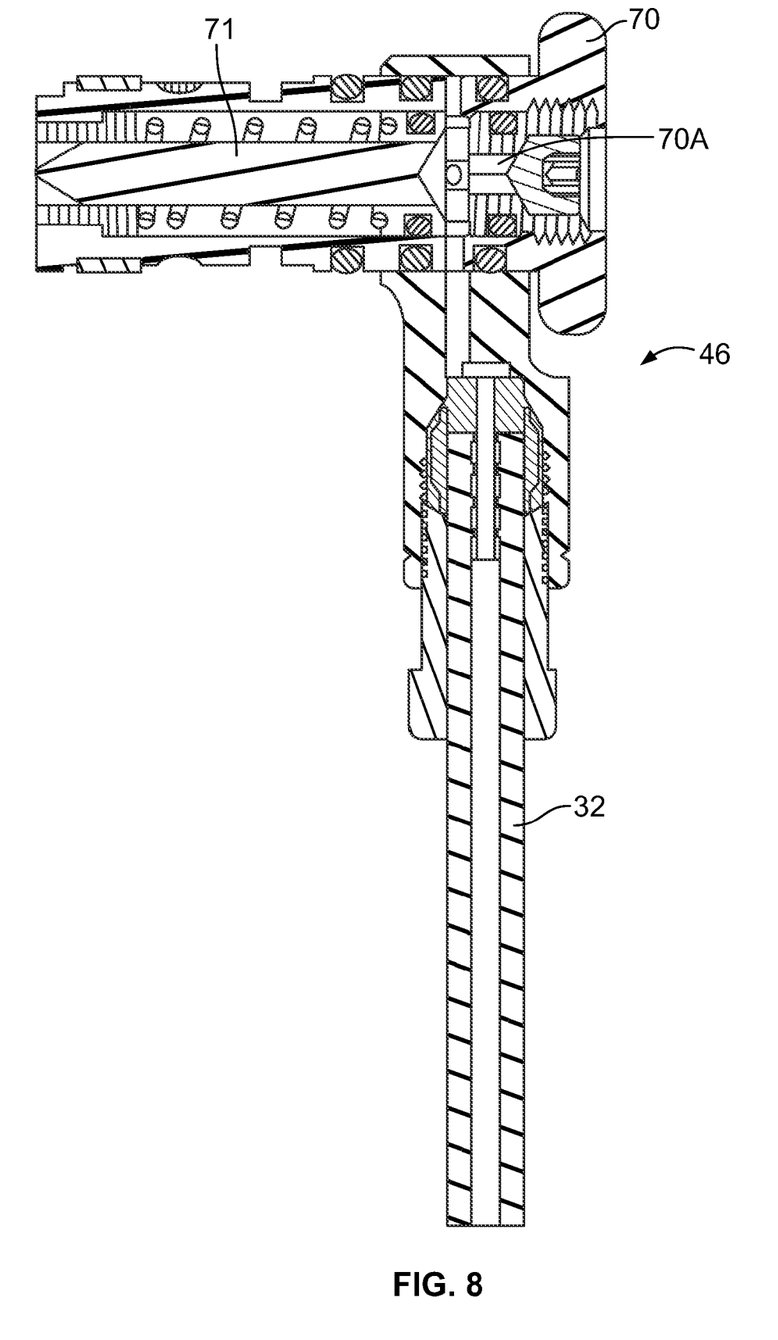
FIG. 8 is a sectional view of the fluid responder of FIG. 7.

Referring to FIGS. 7 and 8, a second fluid responder 46 is mountable to the rear suspension 16 and includes a second responder housing 70 and a fourth piston 71. In FIG. 8, the fourth piston 71 is slidably disposed within a fourth fluid cavity 70a formed within the second responder housing 70. The second fluid path 32, which may include a hydraulic hose or the like, connects the second fluid cavity 29b to the fourth fluid cavity 70a. The fourth piston 71 operates the rear suspension 16 between the first and second suspension settings. Fluid responders of front and rear suspension components for bicycles are well-known devices. The first fluid cavity 29a, the first fluid path 31 and the third fluid cavity 60a form a fluid circuit separate from the second fluid cavity 29b, second fluid path 32 and the fourth fluid cavity 70a.

Returning to FIGS. 3 and 4, the actuator 30 is secured to the first piston 34 by a set screw 39 or any other suitable securing means. In one embodiment, the first piston 34 is formed on a piston rod or shaft 34a. The shaft 34a may be press fit or otherwise disposed within a suitably sized opening or bore 30b in the actuator 30.

Figure 4:
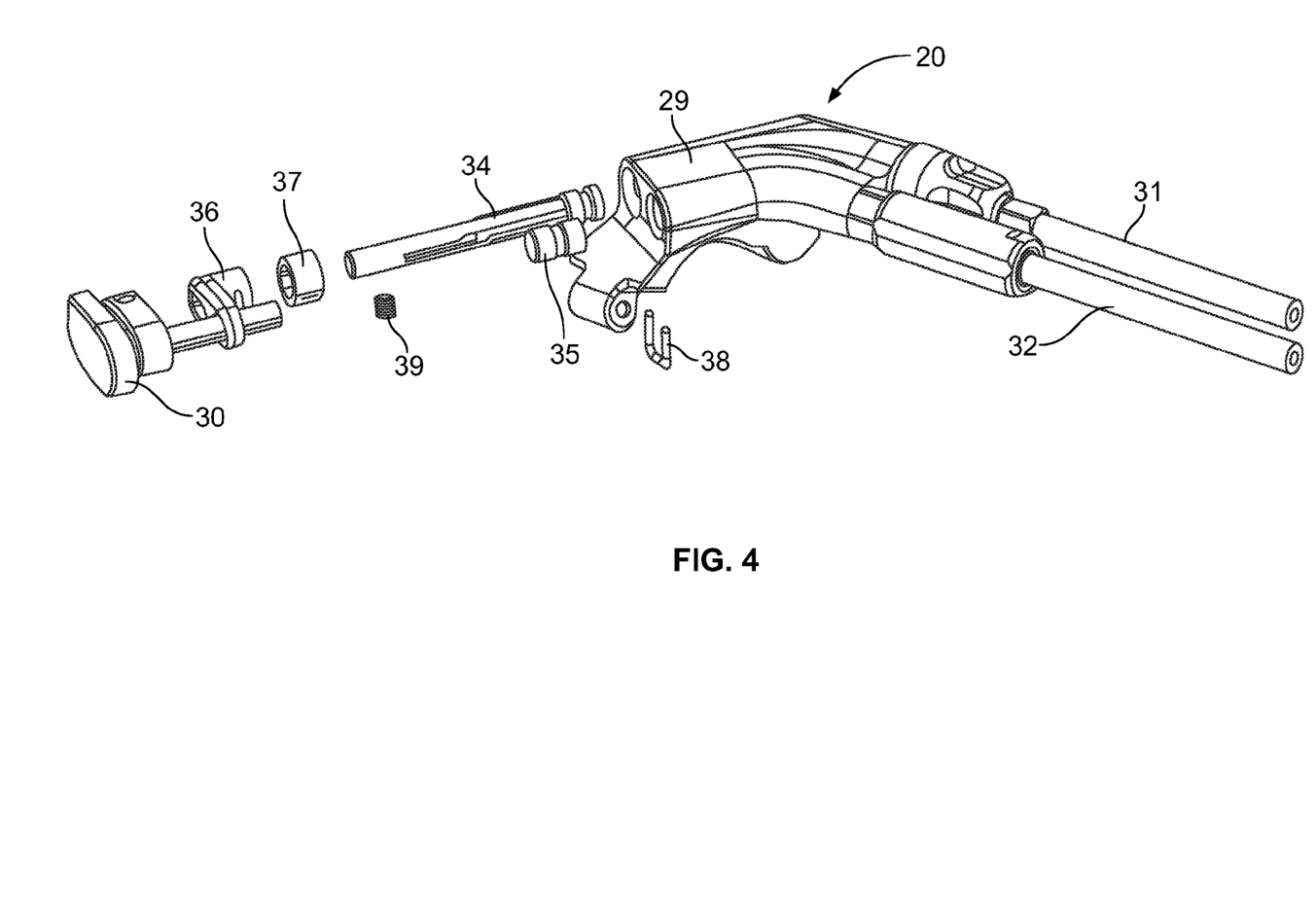
FIG. 4 is an exploded perspective view of the hydraulic control assembly.

In one embodiment, the second piston 35 is not fixed to the actuator 30 and merely abuts the actuator. The actuator 30 has a plunger portion 30a that extends into the second fluid cavity 29b. The plunger portion 30a abuts and is maintained in contact with the second piston 35 by pressure in the second fluid cavity 29b. The first piston 34 and the second piston 35 are retained within the control housing 29 by a piston retainer 36. The piston retainer 36 may be fixed to the control housing 29 by a fixating pin 38 that is pressed into the control housing 29.

Referring to FIG. 3, one embodiment of the hydraulic control assembly 20 contains a latching ring 37 located within the control housing 29 and concentrically disposed about the shaft portion of the first piston 34. The actuator 30 is fixed to the first piston 34; therefore, the interaction of the first piston and the latching ring 37 allows the actuator 30 to toggle between a first extended position and a second non-extended position. The interaction of the actuator plunger 30a and second piston 35 allows the second piston to move between a first extended position and a second non-extended position. When the actuator 30 of the control assembly 20 is moved to the non-extended position, fluid is displaced from the first fluid cavity 29a to the third fluid cavity 60a and from the second fluid cavity 29b to the fourth fluid cavity 70a. The fluid displaced from the first fluid cavity 29a to the third fluid cavity 60a moves the third piston 61 from a first non-extended position to a second extended position. The fluid displaced from the second fluid cavity 29b to the fourth fluid cavity 70a moves the fourth piston 71 from a first non-extended position to a second extended position.

Figures 9, 10:
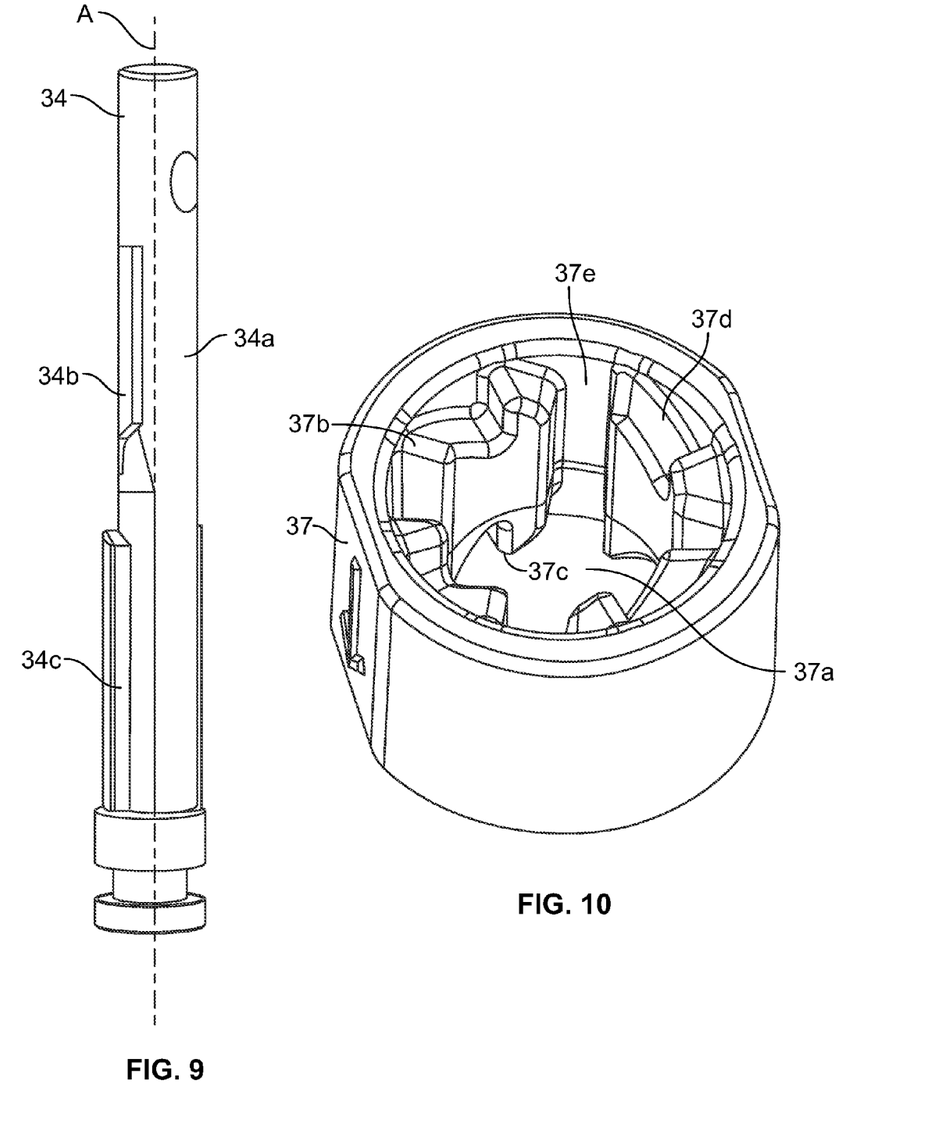
FIG. 9 is a perspective view of the first piston with driving lugs and latching lugs.
FIG. 10 is a perspective view of a latching ring with first and second sets of gear teeth.

Referring to FIG. 9, the first piston 34 has a generally cylindrical shaft 34a including two sets of lugs or extensions 34b, 34c in the general shape of ridges or fins which extend outwardly from the sides of the shaft and have a longitudinal axial extent that is generally parallel to the axis A of the shaft. The lugs 34b, 34c are sized, shaped and positioned on the shaft 34a so as to cooperatively engage with the latching ring 37 to operate the hydraulic control assembly 20 and ultimately effect desirable changes in the operation of the suspensions to which the hydraulic control assembly is attached.

Referring to FIG. 10, the latching ring 37 in this embodiment has a center hole 37a that fits concentrically around the shaft 34a of the first piston 34. The latching ring 37 includes a first set of gear teeth 37b formed at or near the top of the center hole 37a and a second set of gear teeth 37c formed at or near the bottom of the center hole. Each of the first and second set of gear teeth 37b, 37c includes a plurality of gear teeth 37d. In the present embodiment, every other of the gear teeth 37d is interrupted by an axial slot 37e.

The first piston 34 moves axially within the first fluid cavity 29a. The latching ring 37 is installed concentrically around the first piston 34 from the proximal end. The latching ring 37 is free to rotate about the axis of the first piston 34. Axial translation of the latching ring 37 is constrained by a ledge formed in the interior of the control housing 29 and by the piston retainer 36.

Figure 11:
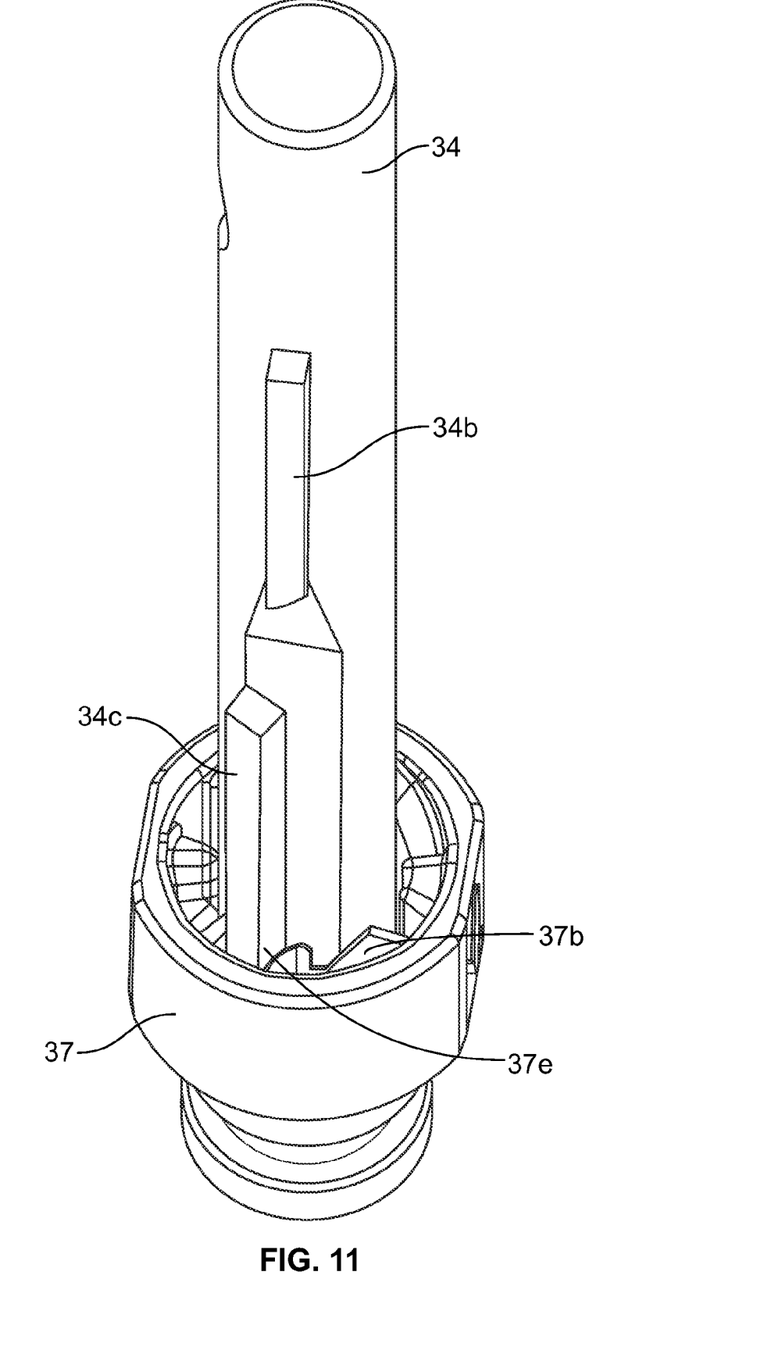
FIG. 11 is the latching ring assembled concentrically to the first piston, with the piston in the fully-extended position.

Referring to FIG. 11, in use, when the actuator 30 is fully extended from the control housing 29, the upper set of lugs 34b (driving set) is positioned above the latching ring 37 and the lower set of lugs 34c (latching set) is keyed to the slots 37e passing through the latching ring 37. As the first piston 34 is depressed axially into the first fluid cavity 29a, the latching lugs 34c slide out of the latching ring slots 37e and the driving set of lugs 34b engages the first set of gear teeth 37b of the latching ring 37 which causes the latching ring to rotate a first amount of approximately 35 degrees around the axis A of the first piston 34. As the first piston 34 extends out of the first fluid cavity 29a, the latching set of lugs 34c engage the second set of gear teeth 37c of the latching ring 37, which rotates the latching ring a second amount of an additional approximately 10 degrees, aligning the latching lugs 34c with a holding feature or land in the second set of gear teeth 37c.

Figure 12:
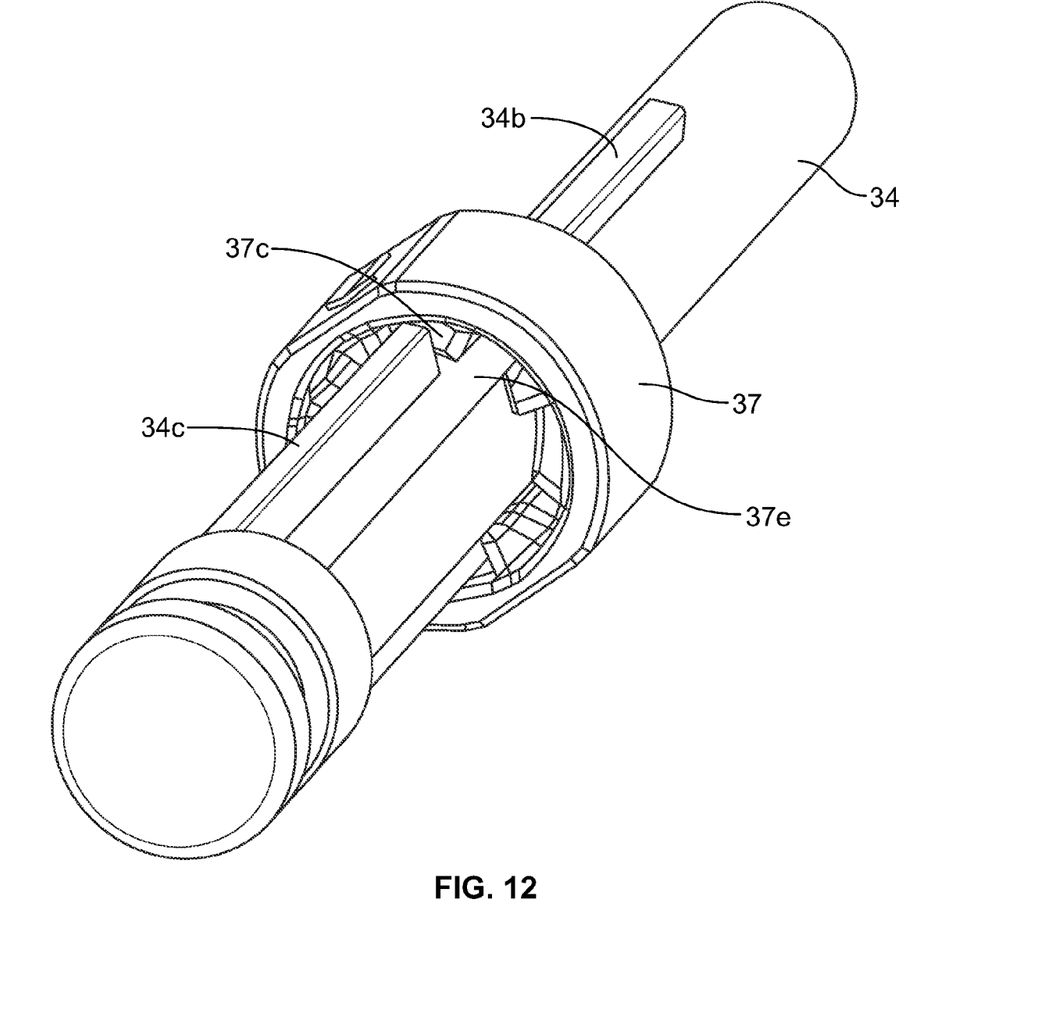
FIG. 12. shows the latching ring assembled concentrically to the first piston, with the piston in the non-extended position.

Referring to FIG. 12, the engagement between the latching lugs 34c and the land of the second set of gear teeth 37c locks the first piston 34 in this second or fluid displacing position. When the first piston 34 is depressed again, the driver lugs 34b engage the gear teeth 37b of the latching ring 37, which rotates the latching ring approximately 35 degrees again. As the first piston 34 extends, the latching lugs 34c engage the second set of gear teeth 37c of the latching ring 37 rotating it an additional 10 degrees. In this position, the latching lugs 34c are realigned with the slots 37e passing through the latching ring 37, which allows the first piston 34 to fully extend to its initial position, which corresponds to the first or non-displaced position.

The interaction of the latching ring 37 and lugs 34b, 34c form a "push-push" toggle mechanism that provides two positions of the actuator 30 and therefore the first and second fluid pistons 34, 35 within respective first and second fluid cavities 29a, 29b, the two positions corresponding to the two suspension settings.

In additional embodiments (not shown), the hydraulic control assembly, including the latching ring 37 and piston 34, may be configured to provide more than two "push-push" toggle positions, corresponding to 3 or more suspension settings.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A bicycle suspension system, comprising:
a bicycle first suspension including a first fluid responder;
a bicycle second suspension including a second fluid responder, the bicycle first suspension and the bicycle second suspension operable between first and second suspension settings;
a hydraulic control assembly including:
a control housing mountable to a bicycle handlebar;
a first fluid pump including a first fluid cavity formed within the control housing and a first piston disposed in the first fluid cavity;
a second fluid pump including a second fluid cavity formed within the control housing and a second piston disposed in the second fluid cavity;
an actuator connected to one of the first and second pistons to operate both first and second fluid pumps in tandem;
a pair of fluid paths, each of the pair of fluid paths respectively linking the first and second fluid pumps to the first and second fluid responders, each of the first and second fluid responders operating the bicycle suspensions between the first and second suspension settings in response to fluid displacement between the first and second fluid pumps and the first and second fluid responders, respectively; and a toggle mechanism operatively connected to only one of the first and second fluid pumps.

2. The bicycle suspension system of claim 1, wherein the actuator is connected to the first piston.

3. The bicycle suspension system of claim 2, wherein the actuator includes a plunger portion that extends into the second fluid cavity and abuts the second piston.

4. The bicycle suspension system of claim 1, wherein the toggle mechanism is disposed within the control housing.

5. The bicycle suspension system of claim 4, wherein the toggle mechanism includes a latching ring that interacts with a shaft portion of the first piston.

6. The bicycle suspension system of claim 5, wherein the latching ring is disposed about the shaft portion of the first piston.

7. The bicycle suspension system of claim 6, wherein the shaft portion of the first piston includes one or more lugs that interact with the latching ring to provide two positions of the actuator.

8. The bicycle suspension system of claim 1, wherein the pair of fluid paths includes a first flexible connector between the first fluid pump and the first fluid responder and a second flexible connector between the second fluid pump and the second fluid responder.

9. The bicycle suspension system of claim 1, wherein the first bicycle suspension includes a front suspension and the second bicycle suspension includes a rear suspension.

10. The bicycle suspension system of claim 1, wherein one of the first and second suspension settings is a lock-out setting.

11. A hydraulic control assembly for operating first and second bicycle suspensions between first and second suspension settings, the hydraulic control assembly, comprising:

a control housing mountable to a bicycle handlebar;

a first fluid pump including a first fluid cavity formed within the control housing and a first piston disposed in the first fluid cavity;

a second fluid pump including a second fluid cavity formed within the control housing and a second piston disposed in the second fluid cavity;

an actuator connected to one of the first and second pistons to operate both first and second fluid pumps in tandem;

a pair of fluid paths, each of the pair of fluid paths respectively linking the first and second fluid pumps to the first and second bicycle suspensions, each of the first and second bicycle suspensions operated between the first and second suspension settings in response to fluid displacement between the first and second fluid pumps and the first and second bicycle suspensions, respectively, and a toggle mechanism operatively connected to only one of the first and second fluid pumps.

12. The hydraulic control assembly of claim 11, wherein the actuator is connected to the first piston.

13. The hydraulic control assembly of claim 12, wherein the actuator includes a plunger portion that extends into the second fluid cavity and abuts the second piston.

14. The hydraulic control assembly of claim 11, wherein the toggle mechanism is disposed within the control housing.

15. The hydraulic control assembly of claim 14, wherein the toggle mechanism includes a latching ring that interacts with a shaft portion of the first piston.

16. The hydraulic control assembly of claim 15, wherein the latching ring is disposed about the shaft portion of the first piston.

17. The hydraulic control assembly of claim 16, wherein the shaft portion of the first piston includes one or more lugs that interact with the latching ring to provide two positions of the actuator.

18. The hydraulic control assembly of claim 17, wherein the one or more lugs includes a driving set of lugs and a latching set of lugs.

19. The hydraulic control assembly of claim 18, wherein the driving set of lugs is positioned to contact a first set of gear teeth of the latching ring and the latching set of lugs is positioned to contact a second set of gear teeth of the latching ring.

20. The hydraulic control assembly of claim 11, wherein the first bicycle suspension includes a front suspension and the second bicycle suspension includes a rear suspension.

21. The bicycle suspension system of claim 11, wherein one of the first and second suspension settings is a lock-out setting.

* * * * *